[11] 3,559,940

| | | | |
|---|---|---|---|
| [72] | Inventor | George R. Kruzell | |
| | | 4301 Hotchkiss, Bay City, Mich. 48706 | |
| [21] | Appl. No. | 767,963 | |
| [22] | Filed | Oct. 16, 1968 | |
| [45] | Patented | Feb. 2, 1971 | |

[54] QUICK DETACHABLE AND REPLACEABLE GUNSIGHT MOUNT
3 Claims, 6 Drawing Figs.

[52] U.S. Cl............................................. 248/216,
33/50; 248/223, 248/226
[51] Int. Cl............................................ F41g 1/38
[50] Field of Search......................................... 248/205,
216, 223, 226; 33/50; 85/7

[56] References Cited
UNITED STATES PATENTS

| | | | |
|---|---|---|---|
| 572,291 | 12/1896 | Crawford...................... | 85/7 |
| 2,583,260 | 1/1952 | Felix............................... | 33/50 |
| 2,649,779 | 8/1953 | Hardgrove et al. ............ | 33/50 |
| 2,839,809 | 6/1958 | Warner et al. ................. | 85/7 |
| FOREIGN PATENTS | | | |
| 504,914 | 8/1954 | Canada ......................... | 33/50 |
| 477,717 | 6/1924 | Germany....................... | 85/7 |
| 160,645 | 9/1957 | Sweden ......................... | 33/50 |

*Primary Examiner*—Marion Parsons, Jr.
*Attorney*—Watson, Cole, Grindle & Watson ABSTRACT: A telescopic gunsight mount capable of being quickly detachable from and replaceable on a gun by means of the wedging action between inclined grooves on a threadless bolt and similar inclined surfaces on a locking bar.

PATENTED FEB 2 1971

3,559,940

INVENTOR
GEORGE R. KRUZELL

BY Watson, Cole,
Grindle & Watson
ATTORNEYS

QUICK DETACHABLE AND REPLACEABLE GUNSIGHT MOUNT

This invention relates generally to a gunsight mount and more particularly to a quick detachable and replaceable locking device for scope mountings and other applications.

Although many riflemen and hunters rely strongly on the use of a telescopic gunsight in the field or on the practice range, it has become somewhat of a burden to remove and replace the gunsight quickly and accurately as the need arises. The use of various tools for affixing and removing the gunsight are not only a nuisance but the fasteners which are used are often lost in the process. Accordingly, one of the objects of the present invention is to provide a telescopic gunsight mount which can be quickly and easily removed and replaced without the use of tools of any kind and without the need for separate fastening means.

Another object of the instant invention is to provide a simple mounting which insures that the telescope, when removed and replaced, will return to its original position without the necessity of any adjustments or danger of loss of previous accurate adjustment.

A further object of the invention is to provide a mounting which can be replaced and removed simply by means of sliding a locking bar into and out of locking position.

A still further object of the instant design is to provide a locking device for a gun mount wherein the scope carrier is locked onto its base member by means of a grooved locking stud as it engages with a slidable locking bar located beneath the base member.

Other objects, advantages and novel features of the invention will become apparent from the following detailed description of the invention when considered in conjunction with the accompanying drawings, wherein.

Figure 1:
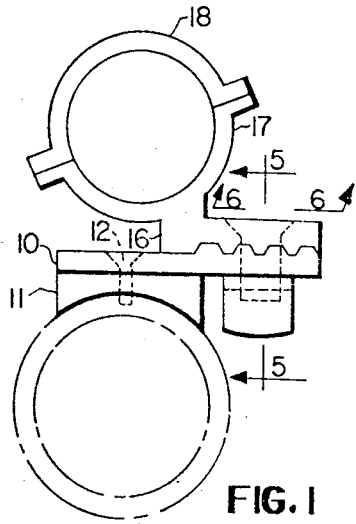
FIG. 1 is an end view of the telescopic gunsight mount according to the invention.
Figure 6:
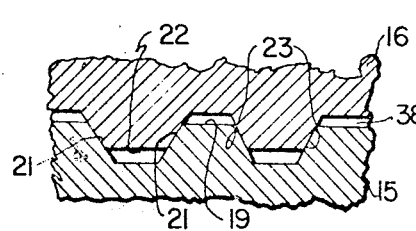
FIG. 6 is a slightly enlarged cross-sectional view taken at line 6–6 of FIG. 1, omitting a showing of the locking stud for purposes of clarity.
Figure 2:
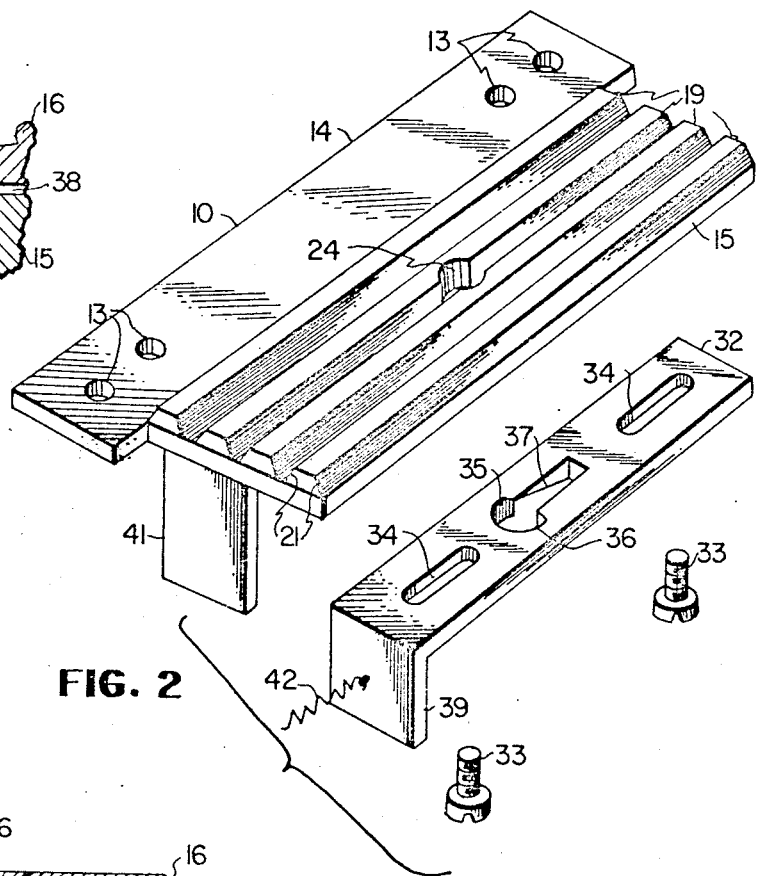
FIG. 2 is a slightly enlarged exploded perspective view showing various parts of the gunsight mount.

Turning now to the drawings wherein like reference characters refer to like and corresponding parts throughout the several views, there is shown a mounting base member 10 and a mounting adapter 11 for securing the base to the receiver of the weapon, shown in phantom, as by fastening means 12 extending through apertures 13 located in the rectangular plate portion 14 of the base member. The base member is provided with an integral lateral extension 15 for supporting a scope carrier 16 thereon which is formed with a conventional bottom half scope ring 17 to which may be fastened a top half ring 18. Although FIG. 1 shows only one of such ring portions it should be understood that the scope carrier is provided with a pair of such split rings in order to firmly secure a telescope, now shown, in position on the carrier. As clearly shown in FIG. 2, the lateral extension 15 is provided with a plurality of longitudinal ribs 19 having slanted engaging surfaces 21. The scope carrier is provided with similar longitudinal ribs 22, also having slanting engaging surfaces 23, so that the ribs of each member may interengage in a manner as shown in FIG. 6. In this way, the scope carrier will always assume its original position of alignment when removed and replaced from the base member 10.

Figure 3:
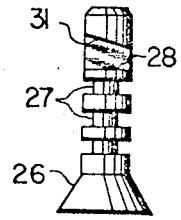
FIGS. 3 and 4 are slightly enlarged perspective views of the locking stud shown rotated 180°.
Figure 4:
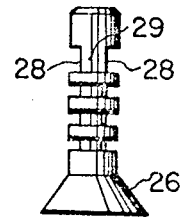
Figure 5:
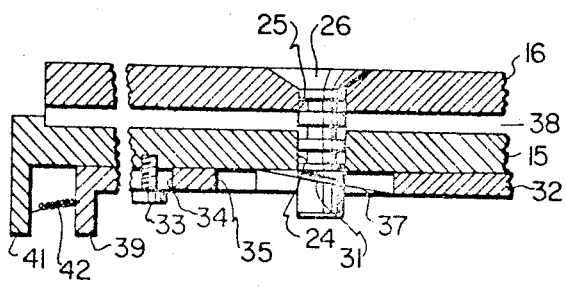
FIG. 5 is a cross-sectional view taken substantially along the line 5–5 of FIG. 1.

As can be seen most clearly in FIG. 5, extension 15 and carrier 16 are provided with apertures 24, 25 which, when axially aligned, will receive a locking stud member 26. Stud member 26, FIGS. 3 and 4, is provided with a plurality of annular grooves 27 along its shank portion so that a tight frictional fit may be thereby insured between the stud and the member 15, 16 after insertion. The stud 26 is in the form of a threadless bolt having a head, as shown, and being of a harder material than members 15, 16, a press fit into the axially aligned apertures will prevent the stud from falling out of the aperture 25 after the scope carrier is removed from its base member. The stud member is also provided with notches 28 near its tip end and at diametrically opposite sides thereof whereby a flat neck portion 29 is formed between the shank of the stud and the transverse stop shoulders 31. It can be noted that the shoulders 31 do not extend diametrically across the bolt but are inclined toward the tip end thereof.

In order to lock the scope carrier bracket 16 firmly in place, a sliding bar 32 is attached to the underside of extension 15 as by screw fasteners 33 extending through a pair of elongated apertures 34 formed near each end of the bar. A keyhole slot 35 is also formed therein and having one end enlarged to form an eye as at 36. The outer surface of the slide bar 32 immediately circumjacent to the narrow portion of the keyhole slot 35, is inclined at 37. The scope carrier 16 may therefore be locked to the base member 10, see FIG. 5, by inserting stud 26 through aligned apertures 24, 25 of the respective members and thereafter moving the bar 32 longitudinally to a position so that the eye 36 of the keyhole slot is axially aligned with the stud for insertion therethrough. The elongated apertures 34 on the bar permit such a sliding movement. After the stud 26 has been completely inserted through the bar 32, the bar is moved leftward in the direction of the arrow so that the inclined surfaces 37 on the bar and the inclined surfaces 31 on the stud will be made to rotation Continued leftward movement of the bar will firmly lock the scope carrier in place and without possibility of rotation because of the firmly intermeshed ribs 19 and 22. Continued movement of the slide increases wedging action with the stud so that the engaging surfaces 21, 23 (FIG. 6) are brought into close intimate contact with each other. The height of ribs 19 and 22 are such that, even when completely intermeshed, the peaks and troughs of the ribs never make contact with each other, but instead, a gap 38 is maintained in order to always insure intimate contact between the engaging surfaces 21, 23. Leftward movement of the slide, as above described, may be enhanced by the provision of depending flanges 39, 41 at the end of slide 32 and extension 15, respectively, and a spring 42 secured at both ends to the flanges so that, as the operator slides the bar 32 for insertion of the stud member, spring 42 will retract the slide upon release.

From the foregoing, it can be seen that a scope carrier, containing a telescopic gunsight, is capable of being quickly and easily removed and replaced from its mounting base without the need for tools or separate fasteners but simply through the use of a sliding locking bar which is finger controlled by the operator. After the stud, tightly fitted with the carrier, is inserted through the base member and slide, the latter is simply released whereby the inclined mating surfaces, described above, wedgingly engage to firmly lock the carrier in place. Because of the intermeshed ribs at the carrier-base joint, rotation and misalignment of the telescope is avoided.

Also, it should be understood that the locking device according to the instant invention can be used on applications other than gunsight mountings without departing from the spirit of the invention.

Obviously, many modifications and variations of the present invention are possible in the light of the above teachings. It is therefore to be understood that within the scope of the appended claims the invention may be practiced otherwise than as specifically described.

I claim:

1. A quick detachable and replaceable mount for a telescopic gunsight comprising:
   a mounting base member having means thereon for attachment to a gun;
   a scope carrier bracket for mounting the telescopic gunsight onto said base member, said carrier bracket and said base member each having axially aligned apertures therein;

means comprising a plurality of longitudinal ribs on said bracket and on said base member in mating engagement with one another for maintaining the telescope in alignment with the longitudinal axis of the gun;

an elongated locking bar slidably secured to the underside of said base member, said bar having a keyhole slot and an inclined outer surface along both sides of the keyhole, said bar also having an elongated slot near each end of said bar;

fastener means for slidably securing said bar to said base member through each of the elongated slots;

a threadless bolt insertable in the axially aligned apertures located in the longitudinal ribs of said bracket and said base member directly through said mating longitudinal ribs and extending through the eye of said bar keyhole slot, said bolt having a pair of transverse grooves near its tip end with the outer surface of each groove being inclined for mating engagement with the inclined surfaces of said bar whereby longitudinal movement of said bar will bring the inclined surfaces of said bar and said bolt into wedging engagement with each other for securely locking said scope carrier to said base member;

said base member and said bar each having a vertical flange adjacent one another at each end of said base member and said bar; and a spring secured at both ends to said flange for urging said bar to move longitudinally for locking said carrier to said base member.

2. The mount according to claim 1 wherein said ribs are truncated in cross section and are of a height such that only the slanting rib surfaces of said bracket and said base member make contact during mating engagement with one another.

3. The mount according to claim 1 wherein said bolt has a plurality of grooves around its shank portion for enhancing frictional engagement of said bolt within the axially aligned apertures of said bracket and base member.